United States Patent [19]
Daouse

[11] Patent Number: 5,248,513
[45] Date of Patent: Sep. 28, 1993

[54] PROCESS TO DEFORM SURFACES OF EXTRUDED MATERIALS

[75] Inventor: Alain Daouse, Noailles, France

[73] Assignee: Nestec, S.A., Vevey, Switzerland

[21] Appl. No.: 967,730

[22] Filed: Oct. 28, 1992

Related U.S. Application Data

[62] Division of Ser. No. 482,830, Feb. 21, 1990, Pat. No. 5,198,245.

[30] Foreign Application Priority Data

Mar. 2, 1989 [EP] European Pat. Off. ........ 89103603.0

[51] Int. Cl.⁵ ............................................. A23P 1/00
[52] U.S. Cl. ................................... 426/512; 426/279; 426/515; 426/516
[58] Field of Search ............... 426/512, 515, 516, 279, 426/101; 99/450.1, 450.8, 461; 264/167, 293; 425/385

[56] References Cited

U.S. PATENT DOCUMENTS

| | | | |
|---|---|---|---|
| 1,480,433 | 1/1924 | Goen | 264/293 |
| 2,334,233 | 11/1943 | Wood | 264/293 |
| 3,141,051 | 7/1964 | Takai | 264/293 |
| 3,215,094 | 11/1965 | Oldershaw et al. | 264/167 |
| 3,339,004 | 8/1967 | Nardone | 264/293 |
| 3,435,107 | 3/1969 | Conrad | 264/293 |
| 4,467,708 | 8/1984 | Twiford et al. | 99/450.8 |
| 4,528,148 | 7/1985 | Dotti | 264/293 |
| 4,533,427 | 8/1985 | Reed et al. | 264/293 |
| 4,547,253 | 10/1985 | Heaney et al. | 264/293 |
| 4,696,635 | 9/1987 | Ohtani | 425/385 |
| 4,751,878 | 6/1988 | Lopes | 99/494 |
| 4,767,304 | 8/1988 | Tashiro | 426/512 |
| 4,925,689 | 5/1990 | Getman | 426/515 |

*Primary Examiner*—George Yeung
*Attorney, Agent, or Firm*—Vogt & O'Donnell

[57] ABSTRACT

A strand of a paste-form material is extruded through a toothed extrusion nozzle to obtain an extruded material having ribs which form a longitudinally ribbed surface. The ribbed surface is deformed by reciprocating comb parts having toothed profiles against the ribbed surface to deform the ribs from their longitudinal orientation.

12 Claims, 2 Drawing Sheets

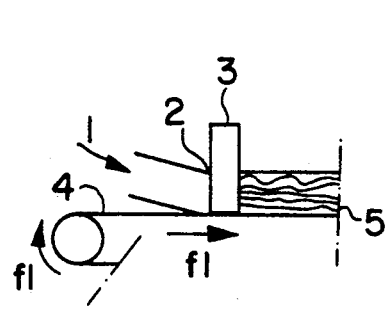
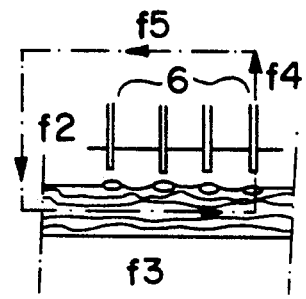
FIG. 1a   FIG. 1b
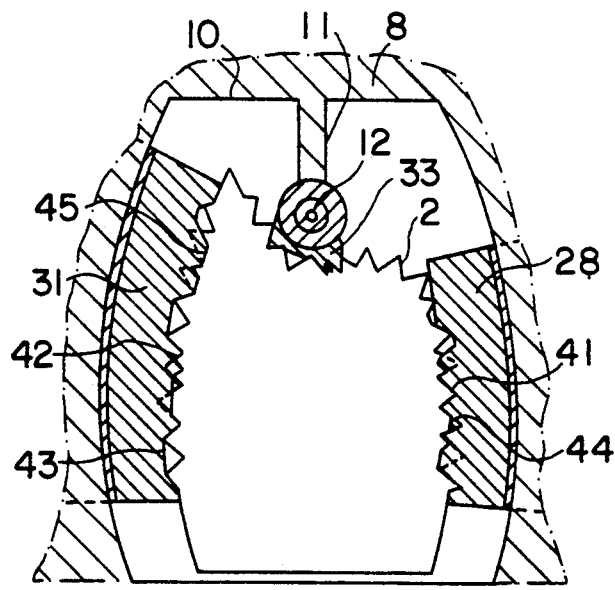
FIG. 4

PROCESS TO DEFORM SURFACES OF EXTRUDED MATERIALS

CROSS REFERENCE TO RELATED APPLICATION

This application is a divisional application of application Ser. No. 07/482,830, filed Feb. 21, 1990, now U.S. Pat. No. 5,198,245.

BACKGROUND OF THE INVENTIONS

The present inventions relate to production of extruded cakes by deposition of a strand of paste-form material, more especially ice cream, from an extrusion die.

Extruded cakes of the yule-log type are made continuously by extrusion of a strand of paste-form material through an extrusion die. Ice cream, for example at a temperature of −6° to −7° C., is sufficiently soft to be shaped. The shape is determined by the toothed profile of a fixed extrusion die which produces straight and parallel ribs on the article. To complete the decoration, auxiliary devices are arranged at the extruder exit for decorating the top of the cake, for example in the form of piping nozzles through which ice cream or chantilly cream, for example, is extruded. Reciprocating movements may be imparted to devices such as these. In addition, devices for applying decorative elements, for example mushrooms, holly leaves, bushes of sugar or marzipan, may also be provided. In some cases, the piping nozzles enter the strand to form cavities imitating the knots in the branch of a tree. Despite all the additional decorations, the ribs on the surface of the strand form a monotonous decoration far removed from the natural relief of tree bark.

SUMMARY OF THE INVENTION

The object of the inventions is to produce a strand with a surface decoration imitating tree bark continuously without any need for the auxiliary addition of paste-form material.

The process of the present inventions is characterized in that is comprises extruding a paste-form material from a toothed extrusion nozzle, to obtain a strand of an extruded material having ribs which form a longitudinally ribbed surface, and reciprocating comb parts having toothed profiles against the ribbed surface of the extruded material to deform ribs from their longitudinal orientation.

The process is further characterized in that it further comprises extruding the strand from a fixed nozzle in a form of an arch with a toothed profile, and deforming the surface into reliefs by means of the comb parts which are movable to follow the curvature of the arch by pivoting about eccentric axes relative to the central axis of the arch.

The process is further characterized in that it further comprises penetrating nozzles into the deformed material to form holes and then introducing a paste-form material from the nozzles into the holes and withdrawing the nozzles from the deformed material.

The present inventions also include the products of the processes of the inventions.

The apparatus according to the inventions is characterized in that it comprises, a nozzle having a passage and a discharge opening in the shape of an arch with a toothed profile, the arch comprising a straight base, curved lateral parts and a curved upper part, and a section of the nozzle having movable parts mounted adjacent each side of the arch and against its upper part in the form of curved combs with toothed profiles to pivot and reciprocate about eccentric axes relative to the central axis of the arch with an alternating rotational movement so that the combs follow the curvature of the lateral and upper parts of the nozzle.

In the context of the present inventions, paste-form material is understood to be a thick or sweetened composition, for example of the type used in confectionery for filling cakes, for example butter cream. It is preferably an overrun composition of ice cream or sorbet.

The inventions also relate to an installation for the production of extruded cakes, characterized in that it comprises the apparatus described above, a conveyor positioned beneath the discharge opening of the nozzle and a station, above the conveyor, and adjacent the nozzle discharge opening comprising piping nozzles which are movable vertically and horizontally to deliver a paste-form material and which are moved in such a way that, from a starting position, the piping nozzles descend and penetrate vertically into the strand, form holes therein,, which are filled with paste-form material, while following movement of the conveyor and are then raised vertically and return to their starting position.

One example of an embodiment of the inventions is described in detail in the following with reference to the accompanying drawings.

BRIEF DESCRIPTION OF THE DRAWINGS

FIG. 1 diagrammatically illustrates the installation.

FIG. 4 is a partial section through the nozzle with the combs on the line C—C of FIG. 3.

DETAILED DESCRIPTION OF THE DRAWINGS

Figure 2:
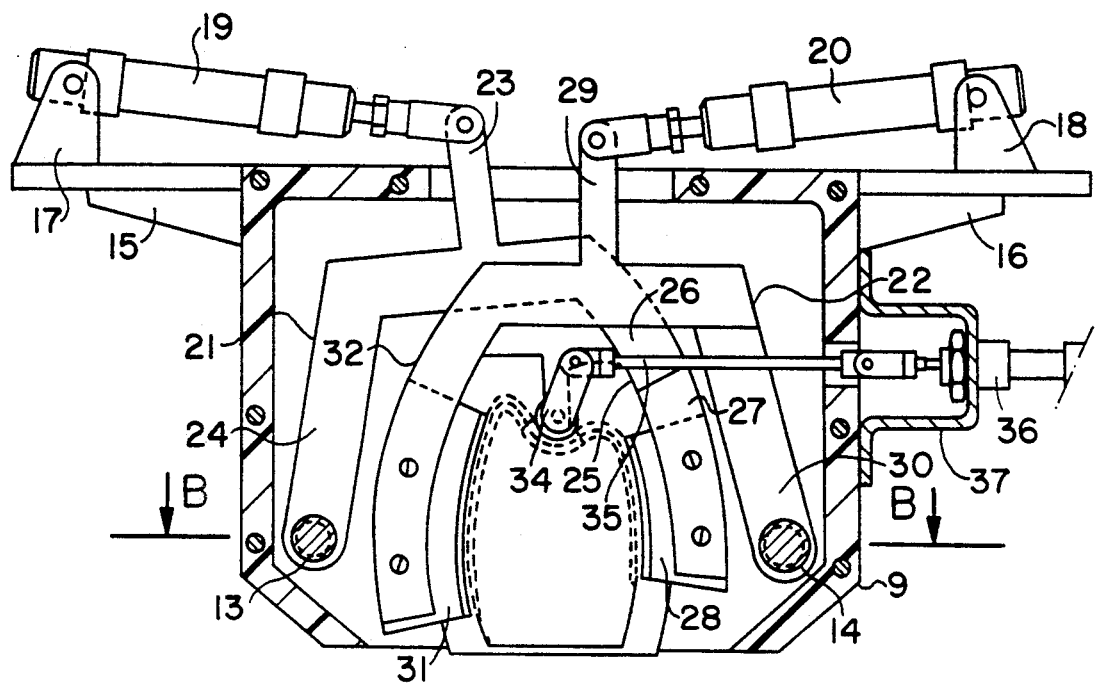
FIG. 2 is a section on the line A—A of FIG. 3 through the section containing the moving parts of the device.

As shown in section a in FIG. 1, the paste-form material 1, for example ice cream, issues continuously in the form of a strand from the fixed toothed nozzle 2, made for example of stainless steel, and its surface is deformed by moving combs accommodated in the section 3 to form the bark. The strand thus deformed is taken up by the conveyor belt 4 circulating in the direction f1 on which a paper web 5 was placed beforehand. As shown in section b, a group of piping nozzles 6 penetrate into the strand by a rapid vertical movement (f2), move horizontally following the conveyor belt while paste-form material is introduced into the holes formed in the strand by the piping nozzles (f3), and when the holes are filled with paste-form material, the piping nozzles are rapidly raised vertically (f4) and then return by a rapid horizontal movement to their starting position (f5). The knots of the log are thus formed.

The strand is then cut into lengths and complementary decorative elements are optionally applied in known manner to the logs obtained, although this has not been shown. The strand guided towards the nozzle may be formed by co-extrusion of several adjacent or preferably coaxial masses of paste-form material differing from one another in colour and flavour. The paste-form materials may contain pieces of, for example, confectionery, truffle, dried or crystallized fruits, optionally flavoured with liqueur.

Figure 3:
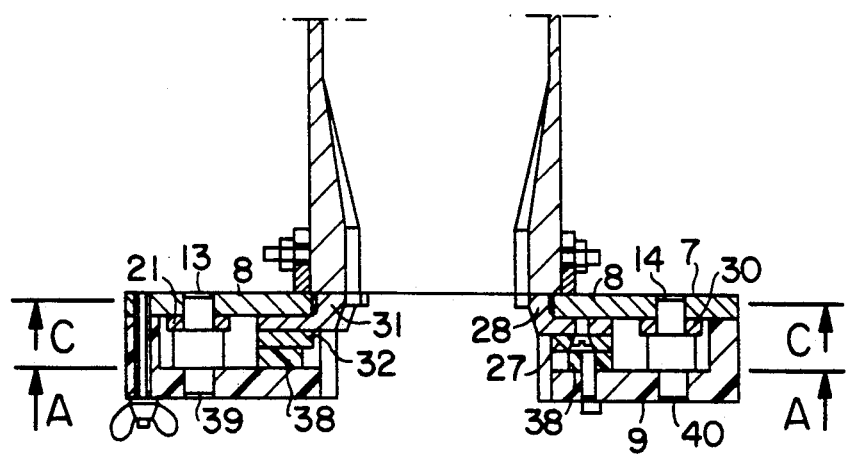
FIG. 3 is a section on the line B—B of FIG. 2.

Referring to FIGS. 2, 3 and 4, the moving part 3 of the apparatus consists of a housing 7 comprising a plate 8 and a cover 9. The function of the plate 8, made for example of stainless steel, is to fix all the moving parts to the extruder and to fix jacks actuating some of the moving parts, as explained hereinafter. The plate 8 is formed with an arch 10 of which the lateral arcs are parallel to the base line of the teeth of the nozzle 2 offset from that line. The upper part of the arch 10 comprises a lug 11 drilled with a hole at 12. On either side of the arch 10, the plate 8 is drilled with holes 13 and 14. On its upper part, the plate 8 comprises brackets 15 and 16 bearing forks 17 and 18 to which the jacks 19 and 20 are pivotally connected at one end. At their other ends, the jacks 19 and 20 are pivotally connected to the intermediate operating elements 21 and 22. The element 21, generally in the shape of a fork, comprises a lug 23 connected to the jack 19. A straight arm 24 of the fork is pivotally connected to the plate 8 by means of a pin which passes through the hole 13. The other arm 25 of the fork is curved into two elements, one element 26 is situated in the plane of the lug 23 and the arm 24 and the other element 27 is situated in front of that plane by the thickness of the element 21. The element 27 acts as a support for the toothed comb 28 of which the profile is L-shaped. Once fixed to the back of its support, the comb 28 is disposed in such a way that the rear face of its teeth is adjacent the right-hand lateral arc of the arch 10 in the plane of the rear face of the plate 8.

The intermediate operating element 22 performs the same function as the element 21 on the other side of the arch 10. It is connected to the jack 20 by the lug 29, is pivotally connected to the plate 8 by its straight arm 30 by means of a pin which extends through the hole 14 and bears the toothed comb 31 on the back of its curved arm 32 which is in the plane of the lug 29. The arm 30 is offset by the thickness of the element 22. In this way, the rear face of the teeth of the comb 31 is adjacent the left-hand lateral arc of the arch 10 in the plane of the rear face of the plate 8.

A comb 33 is pivotally connected to the lug 11 of the plate 8 by a pin which passes through the hole 12. It is integral with the lever 14 which is itself connected by a rod 35 to the jack 36. The jack 36 is fixed to the stay 37 which is in turn fixed to a lateral surface of the cover 9.

The cover 9 is fixed, for example screwed, to the plate 8. It is preferably made of a plastics material, for example polytetrafluoroethylene. It is formed with an arch having the same general contour as the arch 10 facing it. It comprises spacers 38 which help to keep the elements 21 and 22 in place. It is drilled with holes 39 and 40 opposite the holes 13 and 14 of the plate 8 to receive the pivot pins of the elements 21 and 22.

In operation with ice cream, a strand of ice cream at −6° C./−7° C. issues through the fixed toothed nozzle 2. The arch is substantially vertical and perpendicular to the direction of movement of the conveyor 4. It comprises convex lateral arcs and a partly concave upper part. As illustrated, the upper part has a central portion which is concave and outer portions abutting the central portion which are convex. Because the profile is fixed, the ribs applied to the strand are straight and parallel. The jacks 19 and 20, through the reciprocation of their piston, impart an alternating rotational movement of low amplitude to the intermediate operating elements 21 and 22 about their respective pivot pins 13 and 14. The lateral combs 28 and 31 thus follow the curvature of the lateral arcs of the arch.

The combs 28 and 31 are formed by same teeth having the same indentation for example 41, as the indentation of some teeth of the arch, and by same teeth having a lower indentation,, for example 42, than the indentation of some of the teeth of the arch. At certain places, some of the teeth are connected by arcs at their base, for example 43, at an intermediate level, for example 44, or even at their apex, for example 45.

By superposition with the marking produced by the fixed extrusion die, the combs vary the thicknesses and height of the ribs. In addition, by virtue of their movement, the combs transform the straight lines of the ribs into broken or curved lines with a certain overlap. The combs can move in the same direction or in opposite directions. Their change of direction may be gradual or sudden, thus producing curved or interrupted ribs. Their movement should not be too rapid to avoid creating repetitiveness of the decoration. The frequency of their movement is advantageously from 15 to 30 reciprocations per minute for an ice cream delivery rate of approximately 1800 l/h and a speed of the conveyor belt of approximately 7 m/minute.

As explained above in connection with the lateral combs, the comb 33 is given an alternating rotational movement along the concave arcuate portion of the arch by the jack 36 through the rod 35 and the lever 34.

The jacks 19, 20 and 36 are preferably pneumatically controlled independently of one another. In a particularly preferred embodiment, the air pressure in the pneumatic circuit is kept low which produces sudden and random movements favourable to the formation of a non-repetitive decoration.

Alternatively, the operating elements 21, 22 and 34 of the combs may be connected in known manner (not shown), for example by suitable connecting rods, so that they may be actuated by a single jack. However, the gain in simplicity is offset by a loss of variety of decoration.

The comb actuating mechanism may of course be non-pneumatic and, for example, may comprise in known manner a purely mechanical control system based on cams.

I claim:

1. A process for preparing an extruded material comprising:
   extruding a paste-form material from a toothed extrusion nozzle to obtain a strand of an extruded material having ribs which form a longitudinally ribbed surface; and
   reciprocating comb parts having toothed profiles against the ribbed surface of the extruded material to deform ribs from their longitudinal orientation.

2. A process according to claim 1 wherein the nozzle is in a form of an arch and wherein each comb part is reciprocated to pivot about an eccentric axis relative to a central axis of the arch.

3. A process according to claim 1 or 2 wherein the comb parts are reciprocated randomly.

4. A process according to claim 3 wherein the comb parts are pneumatically controlled.

5. A process according to claim 1 or 2 further comprising penetrating nozzles into the material having deformed ribs to form holes and then introducing a paste-form material from the nozzles into the holes and withdrawing the nozzles from the deformed material.

6. A process according to claim 3 further comprising penetrating nozzles into the material having deformed ribs to form holes and then introducing a paste-form material from the nozzles into the holes and withdrawing the nozzles from the deformed material.

7. A product of the process of claim 1.

8. A product of the process of claim 2.
9. A product of the process of claim 3.
10. A product of the process of claim 4.
11. A product of the process of claim 5.
12. A product of the process of claim 6.

* * * * *

UNITED STATES PATENT AND TRADEMARK OFFICE
CERTIFICATE OF CORRECTION

PATENT NO. : 5,248,513

DATED : September 28, 1993

INVENTOR(S) : Alain DAOUSE

It is certified that error appears in the above-identified patent and that said Letters Patent is hereby corrected as shown below:

```
Column 1, line 37, "INVENTION" should be --INVENTIONS--.

Column 1, line 43, "is" should be --it--.

Column 4, line 4, "same" should be --some--.

Column 4, line 6, "same" should be --some--.
```

Signed and Sealed this

Fifteenth Day of March, 1994

BRUCE LEHMAN

*Attest:*

*Attesting Officer*

*Commissioner of Patents and Trademarks*